May 20, 1941.　　　C. S. SWANSON　　　2,242,487
MACHINE FOR FACING ENDS OF FORGINGS
Filed Dec. 23, 1938　　　5 Sheets-Sheet 1
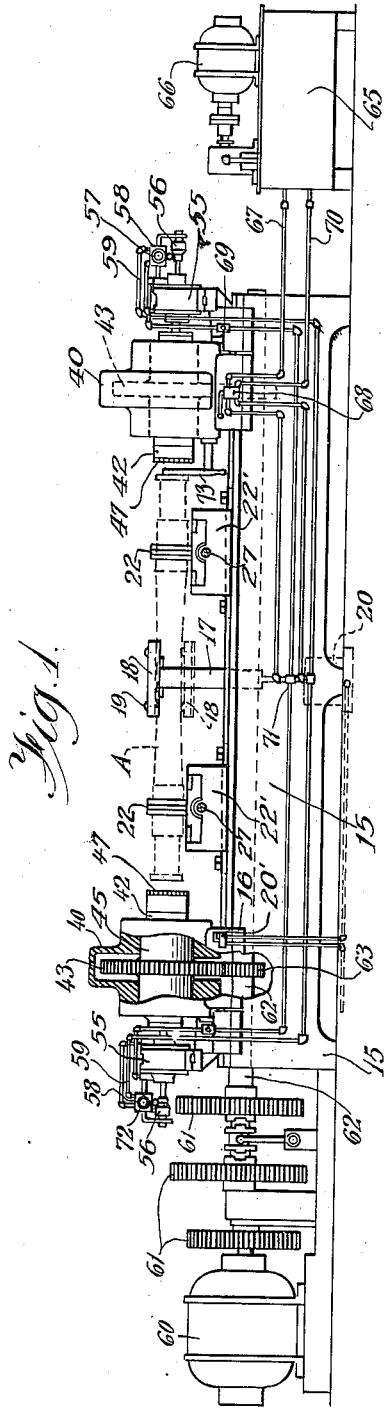
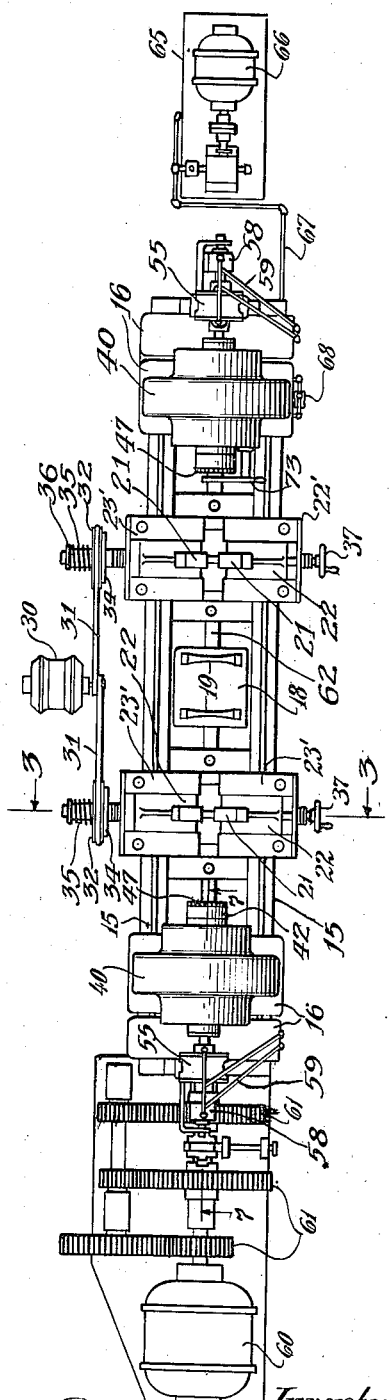

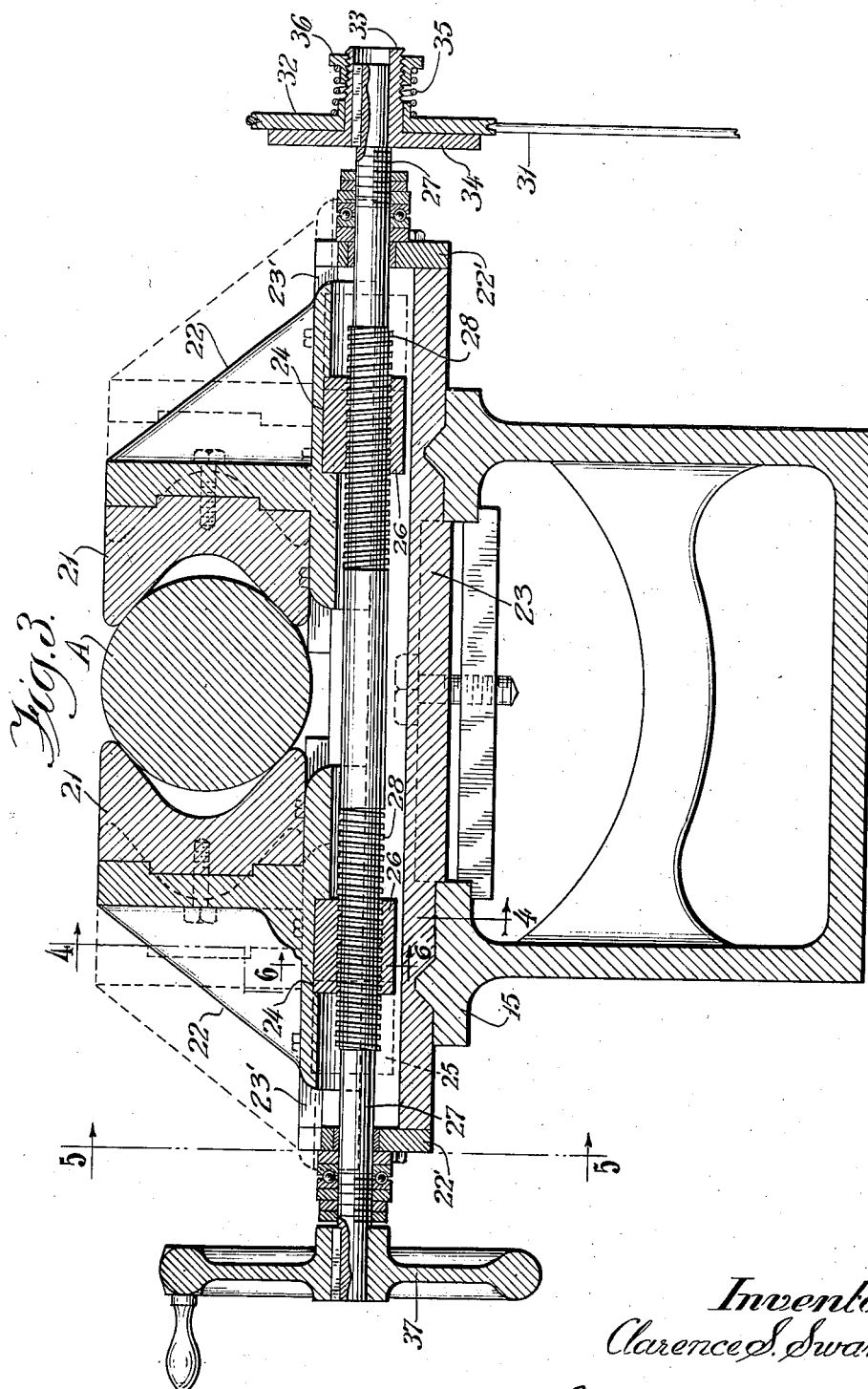

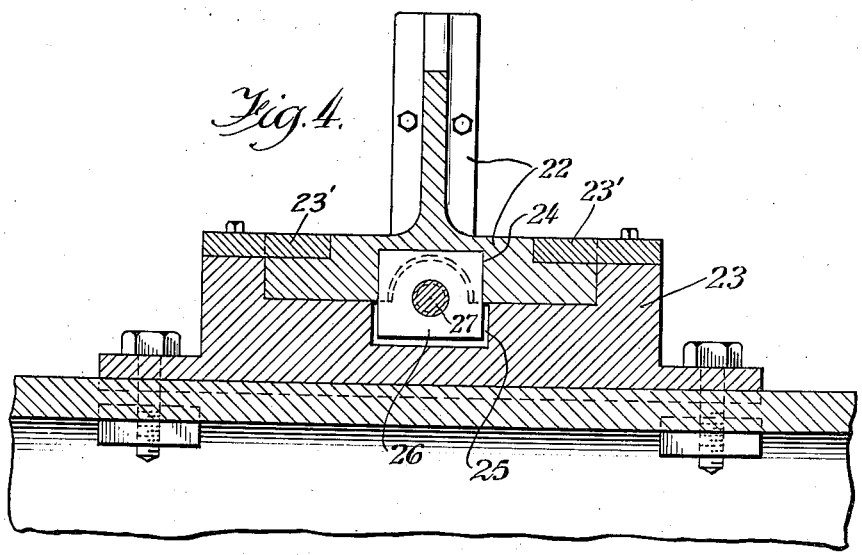
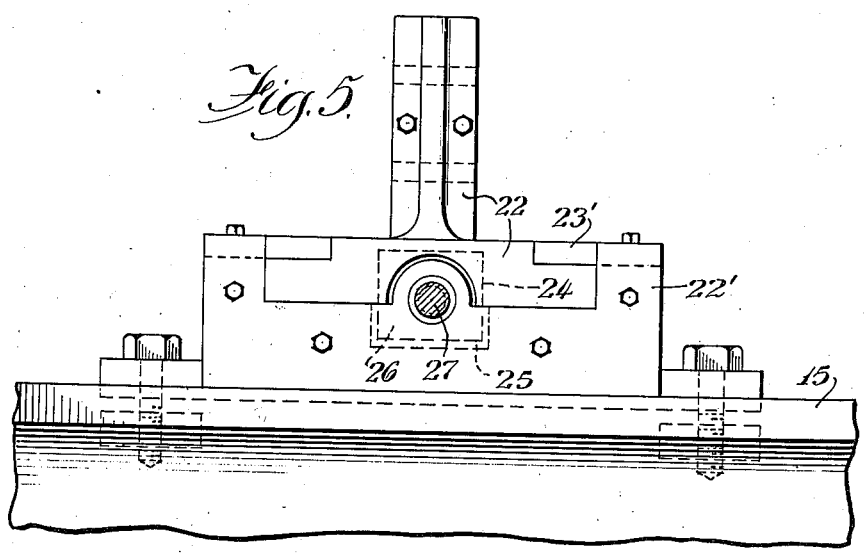
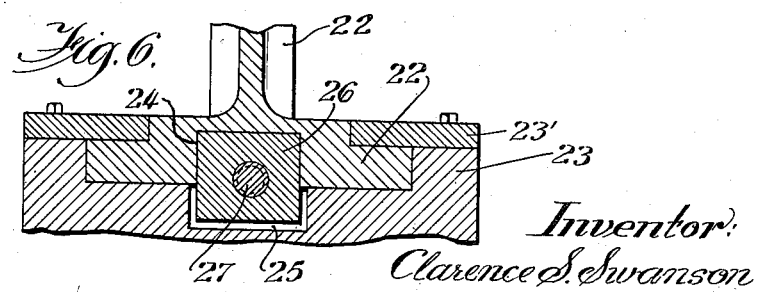

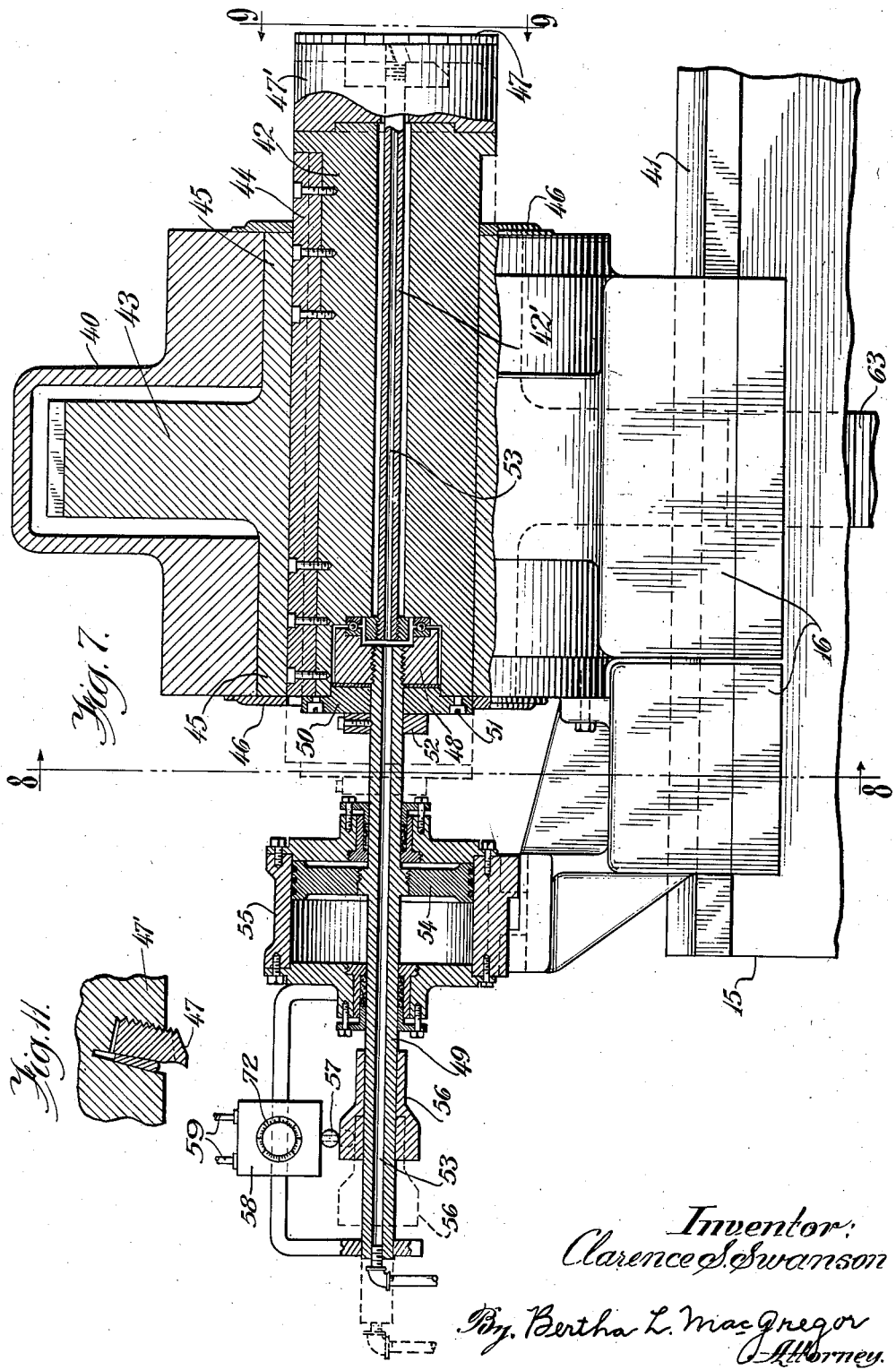

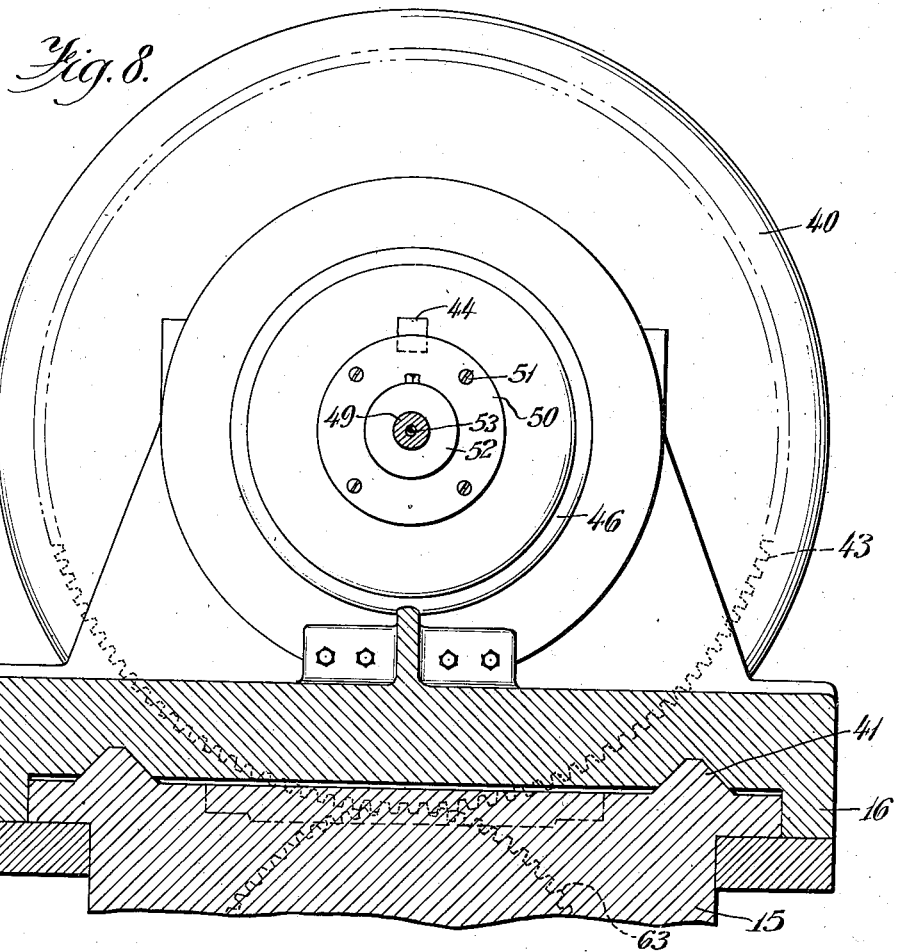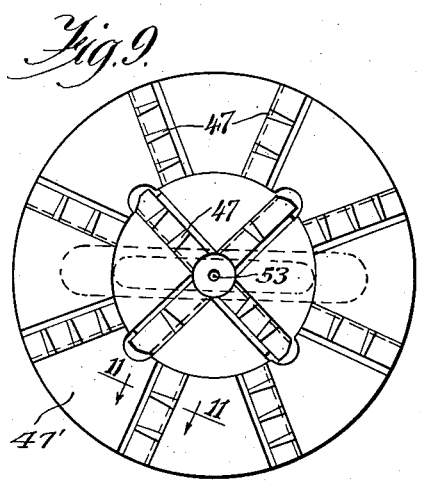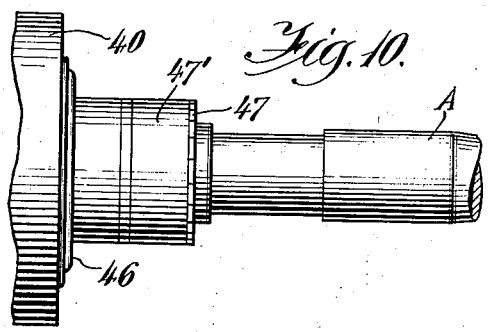

Patented May 20, 1941

2,242,487

UNITED STATES PATENT OFFICE 2,242,487

MACHINE FOR FACING ENDS OF FORGINGS

Clarence S. Swanson, Chicago, Ill., assignor to Standard Forgings Corporation, Chicago, Ill., a corporation of Delaware Application December 23, 1938, Serial No. 247,426

7 Claims. (Cl. 90—14)

This invention relates to a machine tool for facing the ends of forgings, such as railway axles, shafts and the like, for the purpose of producing forgings having end surfaces exactly at a right angle to the axis of the axle or shaft.

Another object is to produce smoothly finished end surfaces, free from scorings and other marks, said surfaces being disposed at true right angles to the center lines of the forgings.

Another object is to produce forgings of exact predetermined length.

The end facing operation is a new step in processes of producing forgings such as axles and shafts, and in my process the facing operation is performed after the axles or other parts have been forged, the ends cut off, and centers machined in said ends. The facing operation is followed by other operations, such as turning of axle journals, wheel seats or center portions, as required. Machines heretofore available for cutting shafts, axles and the like to length have produced pieces of non-uniform length, having end surfaces either concave or convex, and lacking the smooth, flat finish of forgings processed by my machine.

The invention is of special value in the production of railway axles because the true faced, smooth ends produced by my machine greatly reduce heating of the axles in their journal boxes.

In the drawings:

Fig. 1 is a front elevation, partly in section, of a machine tool embodying my invention, showing an axle in dotted lines.

Fig. 2 is a top plan view of the machine.

Fig. 3 is a transverse, vertical section, on an enlarged scale, taken in the plane of the line 3—3 of Fig. 2.

Figs. 4, 5 and 6 are vertical sections taken, respectively, in the planes of the lines 4—4, 5—5 and 6—6 of Fig. 3.

Fig. 7 is a longitudinal, vertical sectional view, partly in elevation, on an enlarged scale, taken in the plane of the line 7—7 of Fig. 2.

Fig. 8 is an elevation, partly in section, taken in the plane of the line 8—8 of Fig. 7.

Fig. 9 is an end elevation of the cutter head as viewed from the plane of the line 9—9 of Fig. 7, but on an enlarged scale.

Fig. 10 is a fragmentary elevation of a cutter head facing an axle end.

Fig. 11 is a sectional view of a detail, taken in the plane of the line 11—11 of Fig. 9.

In that embodiment of the invention shown in the drawings, 15 indicates a base having thereon raised supports 16. A vertical shaft 17 extends through the base 15. On the upper end of the shaft 17 is mounted a work supporting member 18 provided with rollers 19. The member 18 may be raised and lowered, as indicated by the full and dotted line positions, by air or other pressure controlled means, an air cylinder being indicated at 20. Dotted lines indicate an air supply line, having a valve 20', for conveying air to the cylinder 20.

At each side of the work supporting member 18, mounted on the base 15, is a pair of work holding jaws 21, 21, best shown in Figs. 1 to 3, inclusive. The jaws 21 are mounted on or integral with plates 22 movable on recessed bases 23 rigidly secured to the main base 15. End plates 22' and guide bars 23' hold the jaws 21 and their plates 22 on the bases 23.

As shown in Figs. 3 to 6, inclusive, each plate 22 is recessed on its under side as indicated at 24. The bases 23 are recessed as indicated at 25. Said recesses 24 and 25 are designed to receive a square nut 26 threaded on a screw threaded shaft 27. The recess 24 in the jaw plate 22 is only as long as the nut 26, but the recess 25 in the base 23 is longer, that is, in a direction transversely of the machine. The threads 28 on the shaft 27 are right and left hand threads, respectively. When the shaft 27 is turned (Fig. 3), the threads 28 cause the nuts 26, 26 to travel on the shaft 27, either toward or away from each other, in the recesses 25 of the bases 23. Since the nuts 26 fit within the recesses 24 of the jaw plates 22, the movement of the nuts 26 causes the jaw plates 22 and jaws 21 to move also, to engage and disengage the work A.

The means for driving the shafts 27 to actuate the jaws 21 are best shown in Figs. 2 and 3. A motor 30, through belts 31, 31, drives the pulleys 32, 32, on the shafts 27, 27. Between the pulley 32 and shaft 27 is a sleeve 33 having a friction disc 34, against the face of which the pulley is frictionally held by the spring 35 which bears on the pulley and on a nut 36 fixed on the sleeve 33. When the jaws 21 have been moved to the work A and cannot move any farther, the continued operation of the motor 31 causes the pulley 32 to slip relatively to the disc 34. The motor is a reversible one and thus drives the shafts 27 in opposite directions to move the jaws to and from the work.

A hand wheel 37 is provided on the forward end of each shaft 27, for final manual adjustment of the jaws 21. This permits movement of one set of jaws independently of the other set, and compensates for variations in the engaged surfaces of the work, to the end that the work is firmly held during the facing operation.

On the supports 16, outwardly of the jaws 21, are the cutter heads and control means for same, one of the heads and operating means being shown in Fig. 7. Each of the two heads comprises a stationary housing 40 which is fixedly mounted on or is a part of the support 16. Each housing 40 may be moved longitudinally of the base to a selected position on the guides 41 (Fig. 8) as required by the length of the work, and then is rigidly connected to the base. Mounted in the housing 40 is the cutter head 42 which is rotatable in the housing. A gear 43 is mounted on the head 42 and is keyed to the head by a key 44 which permits sliding movement of the head 42 longitudinally while the gear is held in position by means of the hub flanges 45 which bear against rings 46 at each end of the housing 40. Thus the head may be rotated by the gear 43 while the head is moving toward the work.

The head 42 has mounted on its work facing end a plurality of cutter blades 47 as shown in Figs. 7, 9 and 11. Preferably, the blades 47 are mounted in a part 47' held on the head 42 by a rod 42' extending through the head and retained by a nut, as shown in Fig. 7. The head 42 is recessed to receive a nut 48, into which is screwed the end of a piston rod 49, the nut and rod being retained by the disc 50, bolts 51, and collar 52. The rods 49 and 42' are provided with communicating bores 53 through which fluid passes to be sprayed on the work.

A piston 54 is fixed on the rod 49, within a pressure fluid cylinder 55, stationary on the support 16 and spaced from the housing 40 a distance sufficient to allow the cutter head 42 to move away from the work into the dotted line position of Fig. 7. A cam member 56 is fixed to the rod 49 outwardly of the cylinder 55 and is proportioned so that the cam surface will actuate a valve stem 57 in a valve 58 which controls the hydraulic supply lines 59 to the cylinder 55. While the supply line is fully open, as when the cam 56 is in the dotted line position of Fig. 7, the cutter head 42 moves rapidly toward the work, the piston 54 moving from left of the cylinder 55 toward the right, but before the movement is completed, the cam 56 gradually actuates the valve stem 57, reducing the fluid supply in line 59 and reducing the speed of forward movement of the head 42 to a normal cutting feed for the head and cutters. Finally, when the piston 54 and cam 56 are in the positions shown in full lines in Fig. 7, the cutter head will have reached the end of its movement toward the work.

The means for rotating the cutter heads 42 are best shown in Figs. 1, 2 and 7. A motor 60, through a train of gears 61, drives a shaft 62 on which are mounted gears 63 (only one of the two being shown) which mesh with the gear 43 on each of the cutter heads 42. Thus the heads 42 are rotated while they travel toward the work as heretofore explained, under hydraulic pressure exerted against the pistons 54, controlled by cams 56.

The fluid pressure supply means is indicated at 65, motor for driving the pump at 66, high pressure supply line at 67, a valve for controlling the direction of cutter head feed at 68, a shut off valve to operate the heads individually at 69, and a return pipe at 70. The high pressure supply line 67 carries the pressure fluid, preferably oil, to the hydraulic center, as indicated at 71, so that the pressure to both cutter heads is equalized. On the valve 58 is a dial 72 for adjusting the speed of tool feed by controlling the hydraulic supply in the part 59 of the supply line 67.

A spacer 73 is pivotally mounted so as to be movable to a position between one of the cutter heads, in retracted position, and the work A, and serves as a gauge to aid the operator to position the work centrally between the cutter heads.

The operation of the machine is as follows: a forging, such as an axle or the like, which has previously had its ends cut off and centers drilled in them, is rolled from a stock rack onto the work supporting member 18 while in its elevated position. Then the valve 20' is actuated and the member 18 is lowered, moving the work A to position between the jaws 21. The pivotally mounted spacer 73, which has been located as required according to the length of the forgings to be faced, is used as a gauge to manually position the work centrally between the cutter heads, the head housings 40 having been previously fixed on the base 15 in selected positions. The jaws 21 are moved to gripping position by rotating the threaded shafts 27 which are driven by the reversible motor 30 with push button control. If required, the hand wheel 37 may be turned to adjust one set of jaws independently of the other. Thus the work is held firmly between the jaws.

The cutter heads 42, positioned so that the distance between them at the end of their cutting operation is the exact length desired in the work, are rotated by the gear 43, driven by the motor 60 through gearing 61—63. At the same time, under influence of fluid pressure, the heads 42 are moved toward each other, first at rapid speed and then at cutting speed, the variation being controlled by the cams 56 which operate valves in the pressure supply lines leading to the head operating cylinders 55.

After the machining of the ends of the work has been completed, the valve 68 is actuated to reverse the direction of cutter head feed, to move the heads into retracted positions; then the motor 30 is reversed and the jaws 21 are moved to open position, the work support 18 is raised and the work A rolled to a rack (not shown).

Changes may be made in details of construction without departing from the scope of my invention.

I claim:

1. In a machine for facing the ends of axles and the like, a base, a rotatably mounted cutter head on the base, said head comprising a body circular in cross section, a blade carrying end member at one end of the body, a tubular member connected to said end member and extending through the axial center of the body of the head, a nut on the opposite end of the tubular member, a cylinder on the base, a hollow piston rod secured to the nut in continuation of the tubular member of the head, a piston on the rod within the cylinder, and means for actuating the piston, said hollow piston rod and tubular member providing a conduit for conveying fluid to the cutter head to be sprayed on the work.

2. In a machine for facing the ends of axles and the like, a base, a rotatably mounted cutter head on the base, said head comprising a body circular in cross section, a blade carrying member at one end of the body, a tubular member extending through the axial center of the body of the head, a cylinder on the base, a hollow piston rod secured to the tubular member, a piston on the rod within the cylinder, and means for actuating the piston, said hollow piston rod and tubular member providing a conduit for conveying fluid to the cutter head to be sprayed on the work.

3. In a machine for facing the ends of axles and the like, a base, a rotatably mounted cutter head on the base, said head comprising a body circular in cross section, a blade carrying end member at one end of the body, a tubular member connected to said end member and extending through the axial center of the body of the head, a cylinder on the base, a hollow piston rod secured to the tubular member in alignment therewith, a piston on the rod within the cylinder, and means for actuating the piston, said hollow piston rod and tubular member providing a conduit for conveying fluid to the cutter head to be sprayed on the work.

4. In a machine for facing the ends of axles and the like, a base, a housing adjustably fixed on the base, a cutter head rotatable and longitudinally movable in the housing, a driven gear having a flanged hub within the housing feathered on the cutter head, and end members secured to the housing, said flanged hub bearing against said end members and being retained thereby within the housing.

5. In a machine for facing the ends of axles and the like, a base, a housing adjustably fixed on the base, a cutter head rotatable and longitudinally movable in the housing, a driven gear having a flanged hub feathered on the cutter head, and ring members secured to opposite ends of the housing, said flanged hub bearing against said ring members and being retained thereby within the housing.

6. In a machine for facing the ends of axles and the like, a base, a housing adjustably fixed on the base, a cutter head rotatable and longitudinally movable in the housing, a driven gear feathered on the cutter head and located within the housing, a cylinder fixed on the base and spaced from the cutter head, a piston in the cylinder, a piston rod extending through the cylinder and piston, portions of the rod extending beyond opposite ends of the cylinder, one of said portions connecting the piston and cutter head, a cam member on the other portion of said piston rod, a fluid pressure line leading into the cylinder, and a valve in said fluid pressure line actuated by said cam member.

7. In a machine for facing the ends of axles and the like, a base, a rotatably mounted cutter head on the base, a cylinder fixed on the base and spaced from the cutter head, a piston in the cylinder, a piston rod extending through the cylinder and piston, portions of the rod extending beyond opposite ends of the cylinder in alignment with each other, one of said portions connecting the piston and cutter head, a cam member on the other portion of said piston rod, a fluid pressure line leading into the cylinder, and a valve in said fluid pressure line actuated by said cam member.

CLARENCE S. SWANSON.